Dec. 1, 1931.    E. L. CONNELL    1,834,145
VALVE SEATING COUNTERBORING TOOL
Filed Jan. 31, 1929    2 Sheets-Sheet 1
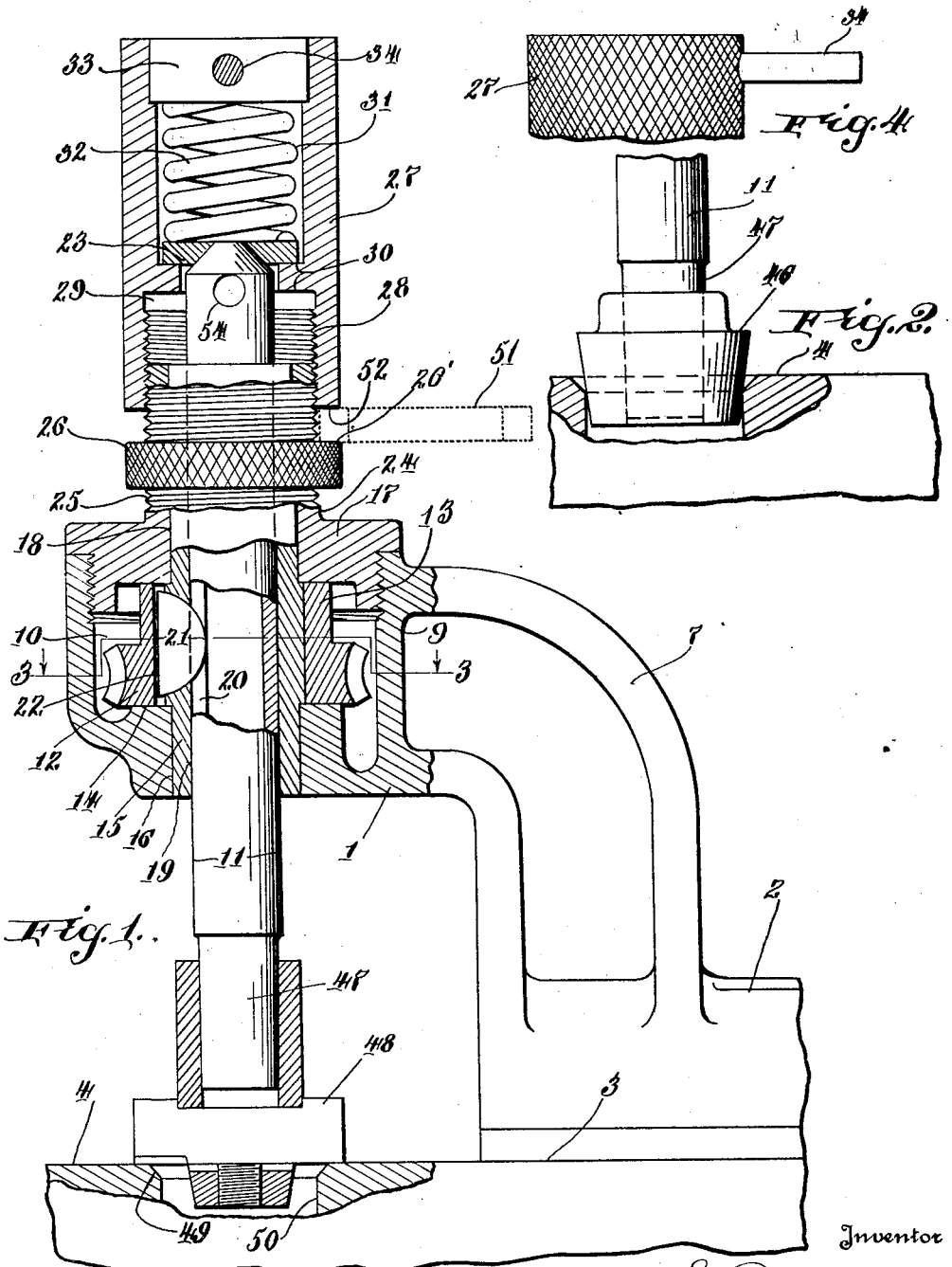
Inventor
Edwin L. Connell Dec. 1, 1931.  E. L. CONNELL  1,834,145
VALVE SEATING COUNTERBORING TOOL
Filed Jan. 31, 1929  2 Sheets-Sheet 2
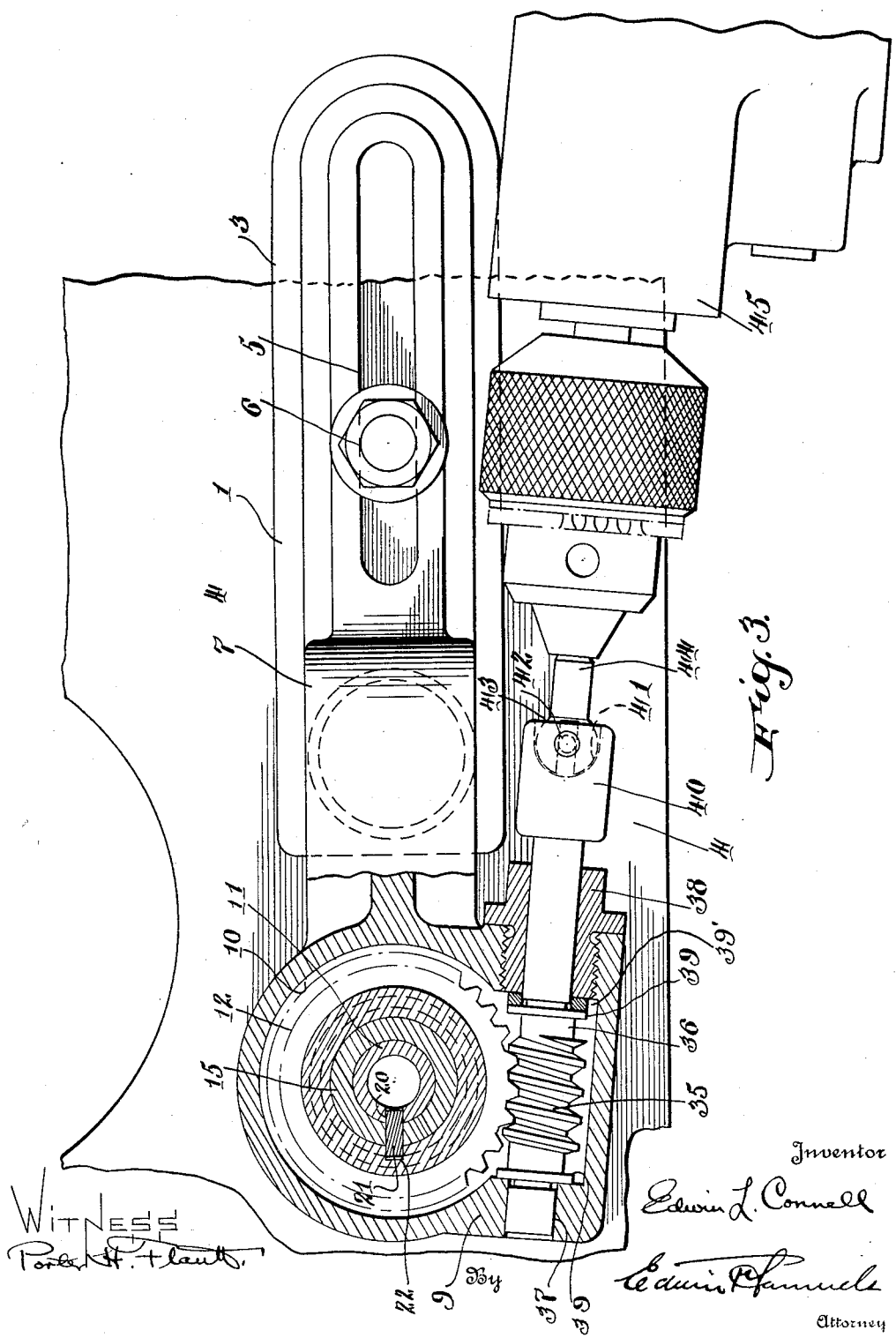
Inventor
Edwin L. Connell Patented Dec. 1, 1931

1,834,145

UNITED STATES PATENT OFFICE

EDWIN L. CONNELL, OF CLEVELAND, OHIO, ASSIGNOR TO THE VAN DORN ELECTRIC TOOL COMPANY, OF CLEVELAND, OHIO, A CORPORATION OF OHIO

VALVE SEATING COUNTERBORING TOOL

Application filed January 31, 1929. Serial No. 336,363.

In the repairing and overhauling of internal combustion motors used as the power plants for motor vehicles, boats, airplanes and airships and for other purposes, it frequently happens that the valve seats become so depressed by frequent grinding or destroyed by burning and the like that a further grinding or reaming will not produce the desired result in the way of a satisfactory seat to receive the valve properly located for the most efficient operation. Under these circumstances the cylinder blocks have been discarded as worn out being regarded as valuable only for the old iron which they might contain.

In accordance with the more enlightened practice, however, the worn seats are counterbored and a ring is inserted in the counterbore. This provides new metal to be reamed and ground forming an entirely new seat which may be formed in the exact position occupied by the original seat.

The present invention relates to a new counterboring tool. For this purpose this tool includes a guide and support which is secured in any suitable manner being preferably clamped to the cylinder block by means of screws in the tapped holes in the block which are ordinarily employed in bolting the head in position or by means of nuts on the studs used for this purpose.

The guide carries a tool arbor which may be driven by any available means as a portable electric drill. This arbor may be centered by means of a cone secured to the arbor in place of the tool which cone fits in the old valve seat or it may be otherwise centered in accordance with the preference of the operator, the important feature of the invention being the arrangement of the device whereby the depth of the counterbore is determined automatically to correspond exactly to the depth or axial length of the new seating ring or seat ring.

In the accompanying drawings I have illustrated a counterboring tool embodying the features of the invention in the preferred form together with fragments of a cylinder block showing the manner of applying, operating and using the tool, the illustration also including a more or less fragmentary illustration of a portable rotary electric tool connected to the counterboring tool to drive the same, though it may be driven in any manner in accordance with the preference and convenience of the operator.

In the drawings:

Figure 1 is a vertical central section through the tool structure taken on the axis of the arbor, portions of the guide and supporting member being shown in elevation, the figure also includes a fragmentary section through a cylinder block or casting, on a plane of the axis of a valve seat to which the tool is applied in its operative relation;

Figure 2 is a vertical section taken through the axis of an internal combustion motor valve seat, the adjacent portions of the cylinder casting being shown in section and a centering cone for the tool being shown in elevation secured to the arbor in operative position in the seat; and Figure 3 is a horizontal section on the line 3—3 of Figure 1, the base portion and arm of the guide and support being shown in plan. It also shows fragmentarily the top of a cylinder casting with the head removed, the tool being clamped in position thereon.

Figure 4 is a fragmentary view of the cap looking from the right in Figure 1.

Referring to the drawings by numerals each of which is used to indicae the same or similar parts in the different figures, the subject matter illustrated comprises a supporting and guiding member 1 for the shaft or tool arbor 11. This member 1 has a base 2 with a bottom surface 3 of considerable area adapted to engage the top surface 4 of a cylinder block or casting, the head being removed. This base is provided with means for securing it to the work consisting in the form shown of an elongated slot 5 through which may be passed the bolt or stud 6, which is seated in the cylinder block, the same being either one of the studs which are used to secure the cylinder head or a bolt threaded into one of the holes formed in the cylinder block for the same purpose, or the base may be secured to the cylinder block or supported in the desired relation thereto by any available means. The guiding member includes an upright arm 7 supported on the base 2, the upper end of the arm being formed into a head 9 which is chambered at 10 to contain the driving and guiding mechanism for the tool arbor 11.

This guiding and driving mechanism includes a worm wheel 12 which may be supported on an upwardly disposed circular flat surface 14 near the bottom of the chamber. This worm wheel 12 is mounted on a hollow spindle 15 which has a bearing at 16 in the head beneath the chamber, said bearing being so arranged that it may be aligned with the axes of the valve seats to be treated. The chamber 10 is closed at the top by means of a plug 17 threaded into the top of the chamber which plug or cover 17 is formed with a upper bearing 18 for the spindle 15, which bearing is aligned with the lower bearing 16, and the gear 12 is shown as provided with a hub 13 which bears at its upper end against the bottom of the plug 17. The worm wheel 12 in turn supports the shaft 11 to which the worm wheel may be secured in any suitable manner.

The spindle 15 being hollow provides a slide bearing 19 in which the arbor 11 is mounted to slide and this has a slot or keyway 20 slidably engaged by a key 21 which rotates the arbor, the said key being seated in the spindle 15 and projecting not only inwardly into the slot 20 in the arbor, but outwardly, in accordance with the form of the invention shown, into a second key slot 22 formed in the worm wheel 12. The details of the spindle, key, gear and arbor may be widely varied, the important features being that the arbor is mounted to slide freely and is rotated by the gear.

It will be noted that the cap or plug 17 is provided with an upward extension 24 surrounding the slide bearing surface and opening 19 for the arbor. This extension 24 is threaded externally at 25 and the thread is engaged by a nut 26 or other suitable spacing or gauge member suitably supported and having a gauge surface 26′. Above the nut 26 the thread 25 on the projection 24 is engaged by a spring cap or carrier 27 which is correspondingly threaded internally at 28. This spring cap 27 has a lower portion 29 in the wall of which the thread 28 is formed and above this lower threaded portion is an inwardly projecting peripheral shoulder or flange 30 which forms the bottom of the spring chamber 31. This spring chamber 31 contains a rather stiff coiled spring 32 which may be supported at the bottom at one end on the peripheral shoulder 30 preferably bearing directly on a button 23 which rests on the shoulder. The spring bears at its other end against any suitable rear abutment shown in the form of a block or plug 33 held in position by a transverse pin 34 or in any suitable manner, the pin being passed through corresponding openings in the cap 27.

The worm wheel 12 which has been described as keyed to the arbor 11 is driven by a worm 35, Figure 3, which meshes with the worm wheel, the said worm being mounted on a shaft 36 having a bearing 37 at one end in the head 9. The worm shaft also has a bearing at its other end in a plug 38 which screws into the said head 9. To take up the end thrust the shaft 36 is provided with shoulders 39 which bear against suitable abutments on the respective bearings a Babbitt metal ring 39′ may be interposed at one end between the shoulder and the bearing surface. The shaft 36 is also provided at its end outside the bearing plug 38 through which it extends with a head 40 or other member adapted to have a driving connection with any suitable source of power.

In the form of the invention shown the head 40 is provided with a hemispheral socket 41 through which is passed a pin 42 and this pin and socket are engaged by a slotted ball 43 on the end of a bit 44 adapted to be seated in the chuck of a power driven portable tool 45.

In the operation of the tool which is the subject of the invention, the base 3 is secured to the top surface 4 of the cylinder block, the head having been removed and the arbor 11 is centered in any suitable manner with the valve seat to be treated.

In accordance with the preferred form of the invention shown, a cone 46 is placed on the taper of the arbor at 47 in place of the regular cutting tool or bit 48 and the nuts on the stud 6 being loose, the guide and support 1 is moved until the arbor is properly centered and aligned with the valve seat 49 on which the tool is to operate and the valve seat opening 50. The cone is removed and a suitable counterboring bit 48 is substituted therefor. For this purpose the cap 27 may be removed and the shaft 11 drawn up sharply in any suitable manner as by inserting the pin 34 which is shown as projecting from the cap for this purpose into the hole 54 in the shaft. This affords a convenient manner of gripping the shaft. The upward motion of the shaft brings the cone and tool, whichever may be secured thereby, into contact with the support 1, resulting in a sufficiently sharp blow to unseat it from the shaft or arbor.

The cap 27 is then screwed downwardly until the bit 48 which is of course larger than the diameter of the old valve seat rests on the surface 4 of the cylinder block at each side of the valve seat and the washer or button 23 at the base of the spring rests on the arbor without compressing the spring so as to lift the button 23 from the shoulder 30, it being understood that the spring is stiff enough and long enough to bear quite positively against the shoulder 30 so that any further compression of the spring by forcing it against the arbor will be apparent.

The seat ring 51 which is to be fitted into the valve seat is then placed with its top surface against the bottom edge referred to herein as the stop gauge surface 52 of the cap 27 and the nut 26 which has been screwed down is turned up against the ring 51. The ring 51 is then removed and the cap 27 is screwed down against the spacing nut 26 which is in reality a gauge, compressing the spring 32 to an extent which exactly equals the depth or axial length of the ring 51.

The cutting tool or counterboring tool 48 is thus pressed against the cylinder block and by rotating the arbor in any suitable manner as by means of a portable power driven drill connected to the worm shaft 36 in any suitable manner as shown, the metal surrounding the valve seat is cut away or counterbored to a depth which is thus determined automatically by the setting of the tool already described, it being understood that the tool will continue to cut until the arbor has moved down to the exact width of the ring 51 at which time the spring through the washer or plate 23 will bear against the shoulder 30 which thus acts as a stop and the pressure of the spring will be removed from the arbor, or relaxed.

I have thus described specifically and in detail a single embodiment of my invention in order that the nature and manner of operating the same may be clearly understood, however, the specific terms herein are used descriptively rather than in a limiting sense, the scope of the invention being defined in the claims.

What I claim as new and desire to secure by Letters Patent is:

1. The combination in a counterboring tool for valve seats of a shaft sliding in the direction of the axis of the valve seat and adapted to carry a counterboring bit, means for rotating the shaft and a spring applying cutting pressure to the bit, a carrier for the spring adjustable in the direction of the valve seat axis, a gauge adjustable in the same direction and operatively disposed in a direction opposite to the direction of cutting, the spring carrier having a gauge disposed in the direction of cutting, whereby the compression of the spring may be determined by the spacing of the gauges to give a corresponding predetermined depth of the counterbore as the spring expands advancing the cutter.

2. The combination in a valve seat counterboring tool for internal combustion motors and the like of a rotary member adapted to carry a counterboring bit, a guide in which the rotary member is slidably mounted, the same being adapted to be secured in adjustable relation to a cylinder block substantially in alignment with the axis of a valve seat, means for driving the rotary member, a spring for applying cutting pressure to the bit, means including a spring stop and a gauge disposed in the direction of cutting both being adjustable in the direction of the said axis and a gauge member separately adjustable in the same direction to give automatically a definite compression of the spring and a predetermined depth of the counterbore due to its corresponding expansion of the spring and to the action of the spring stop in its adjusted position.

3. The combination in a valve seat counterboring tool for internal combustion motors and the like of an arbor adapted to carry a counterboring bit, a guide in which the arbor is slidably mounted, the same being adapted to be secured in adjustable relation to a cylinder block with the arbor substantially in alignment with the axis of a valve seat, means for rotating the arbor including means adapted for connection to a source of power, a spring for applying cutting pressure to the arbor, a spring stop limiting the expansion of the spring in the direction of cutting, means for adjusting the stop and the spring toward and from the work, a stop gauge, and a gauge member adjustable toward and from the work having a gauge surface disposed toward the stop gauge and located on the side thereof toward the work, giving a determinable compression and expansion of the spring and a corresponding predetermined depth of the counterbore due to the position of said spring stop.

4. The combination in a valve seat counterboring tool for internal combustion motors and the like of an arbor adapted to carry a counterboring bit, a guide in which the arbor is slidably mounted, the same being adapted to be secured in adjustable relation to a cylinder block with the arbor in alignment with the axis of a valve seat, means for rotating the arbor, a spring for applying cutting pressure to the arbor, a spring carrier adjustable in the direction of said axis having abutments on both sides of the spring and having a gauge disposed toward the work, a second gauge adjustable in the direction of the said axis and disposed toward the first mentioned gauge.

5. The combination in a valve seat counterboring tool for internal combustion motors and the like of an arbor adapted to carry a counterboring bit, a guide in which the arbor is slidably mounted, the same being adapted to be secured in adjustable relation to a cylinder block with the arbor in alignment with the axis of a valve seat, means for rotating the arbor, a spring for applying cutting pressure to the arbor, a spring carrier adjustable in the direction of said axis having abutments on both sides of the spring and having a gauge disposed toward the work, a second gauge adjustable in the direction of the said axis and disposed toward the first mentioned gauge, the spring being stiff enough to indicate the position of the spring abutment on the cutting side of the spring in relation to the arbor.

6. The combination in a valve seat counterboring tool for internal combustion motors and the like of an arbor adapted to carry a counterboring bit, a guide in which the arbor is slidably mounted adapted to be secured in operative relation to the cylinder block whereby the arbor may be adjusted in substantial alignment with the axis of the valve seat, means for rotating the arbor including means adapted for connection to a source of power, a spring for applying cutting pressure to the arbor, a stop limiting the expansion of the spring toward the work, the same being adjustable toward and from the work and having a stop gauge surface disposed toward the work, a gauge member adjustable toward and from the work and having a gauge surface disposed toward the first mentioned gauge surface and on the side thereof toward the work whereby the abutment being so adjusted that the spring pressure is applied both to the abutment and the arbor, the adjustable gauge being spaced from the stop gauge surface by the depth of the proposed cut, the stop may then be adjusted in the direction of cutting until the stop gauge surface comes in contact with the adjustable gauge giving a feed of the arbor due to the tension of the spring and the position of the stop which is limited in extent to the predetermined depth of the cut.

7. The combination in a valve seat counterboring tool for internal combustion motors and the like of means for supporting a counterboring tool comprising a hollow spindle, a shaft for the counterboring tool slidably mounted in the spindle to rotate therewith, means for rotating the spindle adapted for connection to any convenient source of power, a bearing for the spindle and means for supporting the same in alignment with the valve seat, the support carrying a threaded portion aligned with the shaft, a spring carrier having a threaded engagement with said thread, whereby it may be adjusted in the direction of cutting, opposed abutments for the spring on said carrier, the parts being adjustable so that the spring bears in the direction of cutting on the corresponding abutment and at the same time transmits pressure to the shaft, said carrier having gauge means disposed in the direction of cutting, a gauge member on said threaded projection also adjustable in the direction of cutting and having a gauge surface disposed toward said gauge means.

Signed by me at Cleveland, Ohio, this 21st day of January, 1929.

EDWIN L. CONNELL.